(12) United States Patent
Yokota et al.

(10) Patent No.: US 9,806,569 B2
(45) Date of Patent: Oct. 31, 2017

(54) HYBRID EXCITATION ROTATING ELECTRICAL MACHINE

(71) Applicant: AISIN AW CO., LTD., Anjo-shi, Aichi-ken (JP)

(72) Inventors: Junichi Yokota, Nagoya (JP); Katsuichi Kono, Okazaki (JP); Ken Takeda, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 650 days.

(21) Appl. No.: 14/372,358

(22) PCT Filed: Jan. 31, 2013

(86) PCT No.: PCT/JP2013/052259
§ 371 (c)(1),
(2) Date: Jul. 15, 2014

(87) PCT Pub. No.: WO2013/129022
PCT Pub. Date: Sep. 6, 2013

(65) Prior Publication Data
US 2014/0368077 A1 Dec. 18, 2014

(30) Foreign Application Priority Data
Feb. 29, 2012 (JP) ................................ 2012-044851

(51) Int. Cl.
*H02K 1/22* (2006.01)
*H02K 21/04* (2006.01)
(Continued)

(52) U.S. Cl.
CPC ............. *H02K 1/223* (2013.01); *H02K 1/278* (2013.01); *H02K 1/30* (2013.01); *H02K 19/12* (2013.01); *H02K 21/04* (2013.01); *H02K 16/02* (2013.01)

(58) Field of Classification Search
CPC ........ H02K 1/223; H02K 21/04; H02K 1/278; H02K 19/12; H02K 1/30; H02K 16/02
(Continued)

(56) References Cited

U.S. PATENT DOCUMENTS 4,476,408 A * 10/1984 Honsinger ............. H02K 21/46
310/156.84
4,656,379 A 4/1987 McCarty
(Continued)

FOREIGN PATENT DOCUMENTS

DE 10 2010 043 970 A1 5/2012
EP 0 631 373 A2 12/1994
(Continued)

OTHER PUBLICATIONS

Apr. 9, 2013 International Search Report issued in International Application No. PCT/JP2013/052259.

*Primary Examiner* — Hanh Nguyen
*Assistant Examiner* — Leda Pham
(74) *Attorney, Agent, or Firm* — Oliff PLC

(57) ABSTRACT

A hybrid excitation rotating electrical machine configured with a rotor having a shaft extended on at least one side in an axial direction, and first and second cores that are separated in the axial direction with a gap between the cores. First magnetic poles that are excited by a permanent magnet and second magnetic poles that are not excited by the permanent magnet are alternately arranged in a circumferential direction in each of the first and second cores. The first magnetic poles of the first core have a different polarity from that of the first magnetic poles of the second core, and the first magnetic poles of one of the first and second cores are placed so as to face the second magnetic poles of the other of the first and second cores in the axial direction with the gap between the magnetic poles.

19 Claims, 11 Drawing Sheets

(51) Int. Cl.
*H02K 1/27* (2006.01)
*H02K 1/30* (2006.01)
*H02K 19/12* (2006.01)
*H02K 16/02* (2006.01)

(58) Field of Classification Search
USPC .................................................. 310/112–114
See application file for complete search history.

(56) References Cited

U.S. PATENT DOCUMENTS

| | | | |
|---|---|---|---|
| 5,504,382 A | 4/1996 | Douglass et al. | |
| 5,672,926 A * | 9/1997 | Brandes | H02K 1/2746 174/DIG. 20 |
| 5,682,073 A * | 10/1997 | Mizuno | H02K 21/046 310/156.25 |
| 5,689,166 A | 11/1997 | Nagayama et al. | |
| 6,194,852 B1 | 2/2001 | Lovatt et al. | |
| 7,023,121 B2 | 4/2006 | Kusase et al. | |
| 7,755,243 B2 | 7/2010 | Mizutani et al. | |
| 7,969,056 B2 * | 6/2011 | Mizutani | H02K 21/046 310/156.07 |
| 2003/0052564 A1 | 3/2003 | Wilsdorf | |
| 2003/0102758 A1 | 6/2003 | Kusase et al. | |
| 2007/0236098 A1 | 10/2007 | Kusase et al. | |
| 2009/0295249 A1 | 12/2009 | Kinjou et al. | |
| 2010/0013340 A1 * | 1/2010 | Brown | H02K 21/046 310/181 |

FOREIGN PATENT DOCUMENTS

| | | |
|---|---|---|
| JP | U-62-14974 | 1/1987 |
| JP | A-2-246749 | 10/1990 |
| JP | A-6-351206 | 12/1994 |
| JP | A-8-251891 | 9/1996 |
| JP | A-11-234932 | 8/1999 |
| JP | A-2001-508997 | 7/2001 |
| JP | A-2002-199632 | 7/2002 |
| JP | A-2003-164127 | 6/2003 |
| JP | A-2005-45923 | 2/2005 |
| JP | B2-3724416 | 12/2005 |
| JP | 2006-333642 A | 12/2006 |
| JP | A-2007-282420 | 10/2007 |
| JP | A-2010-148257 | 7/2010 |
| JP | B2-4623471 | 2/2011 |
| JP | B2-4623472 | 2/2011 |

* cited by examiner

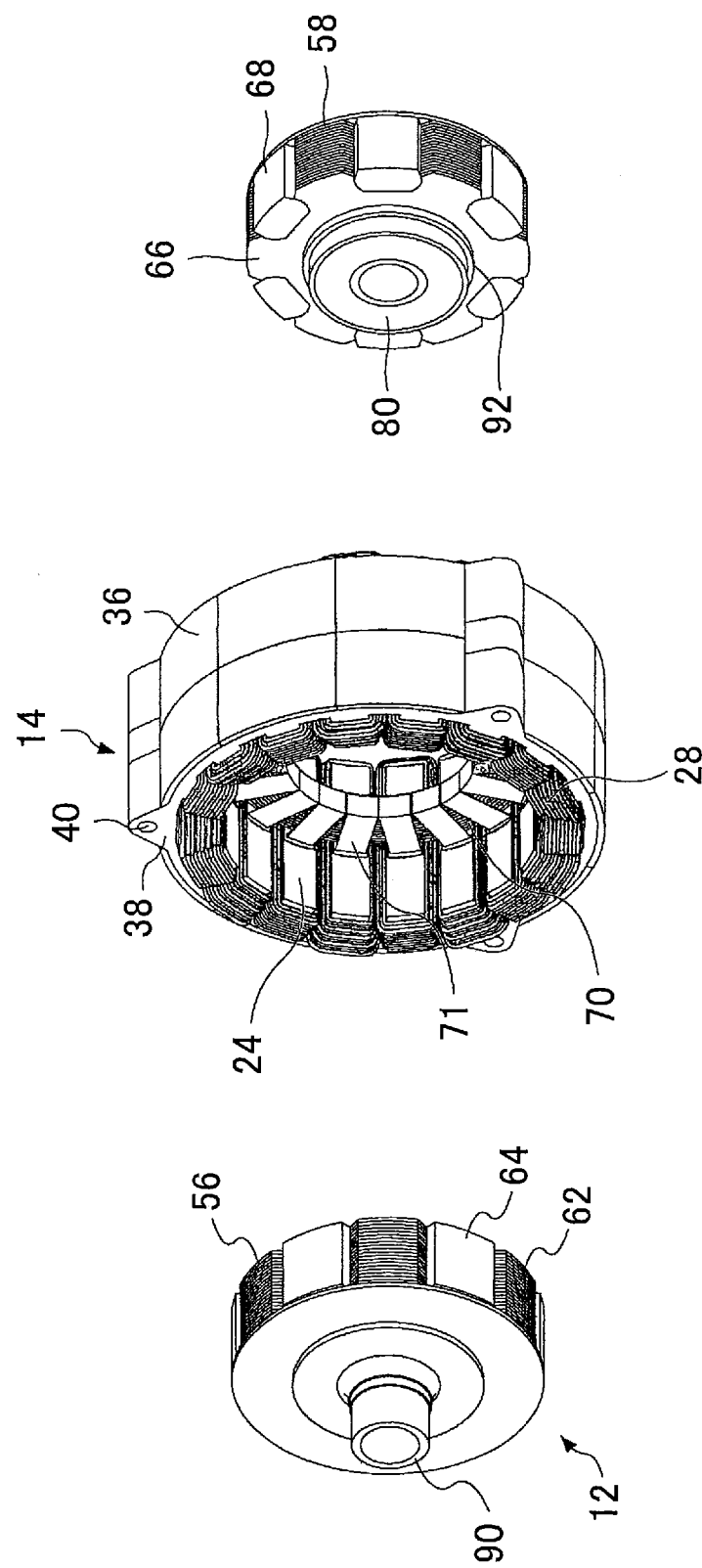

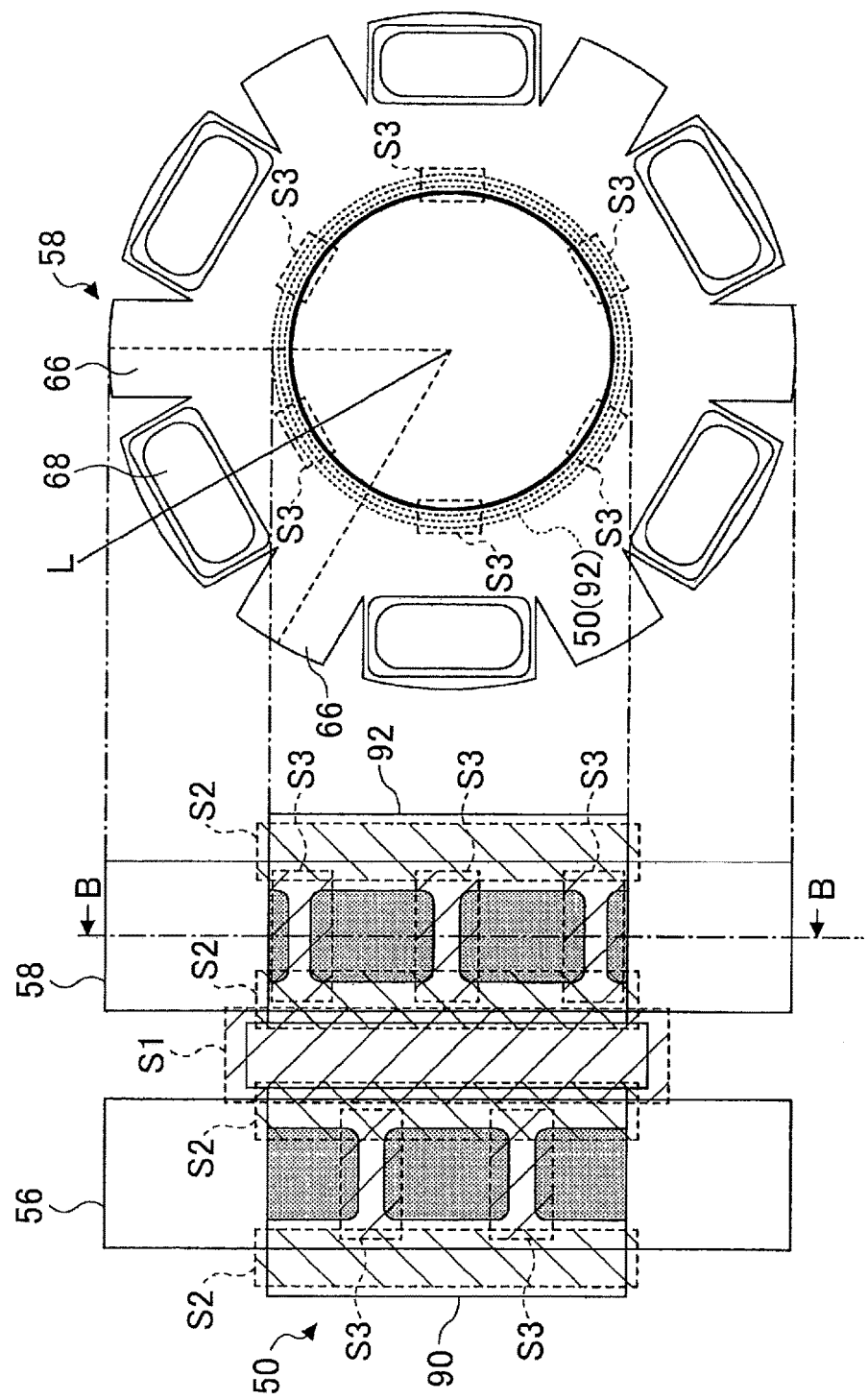

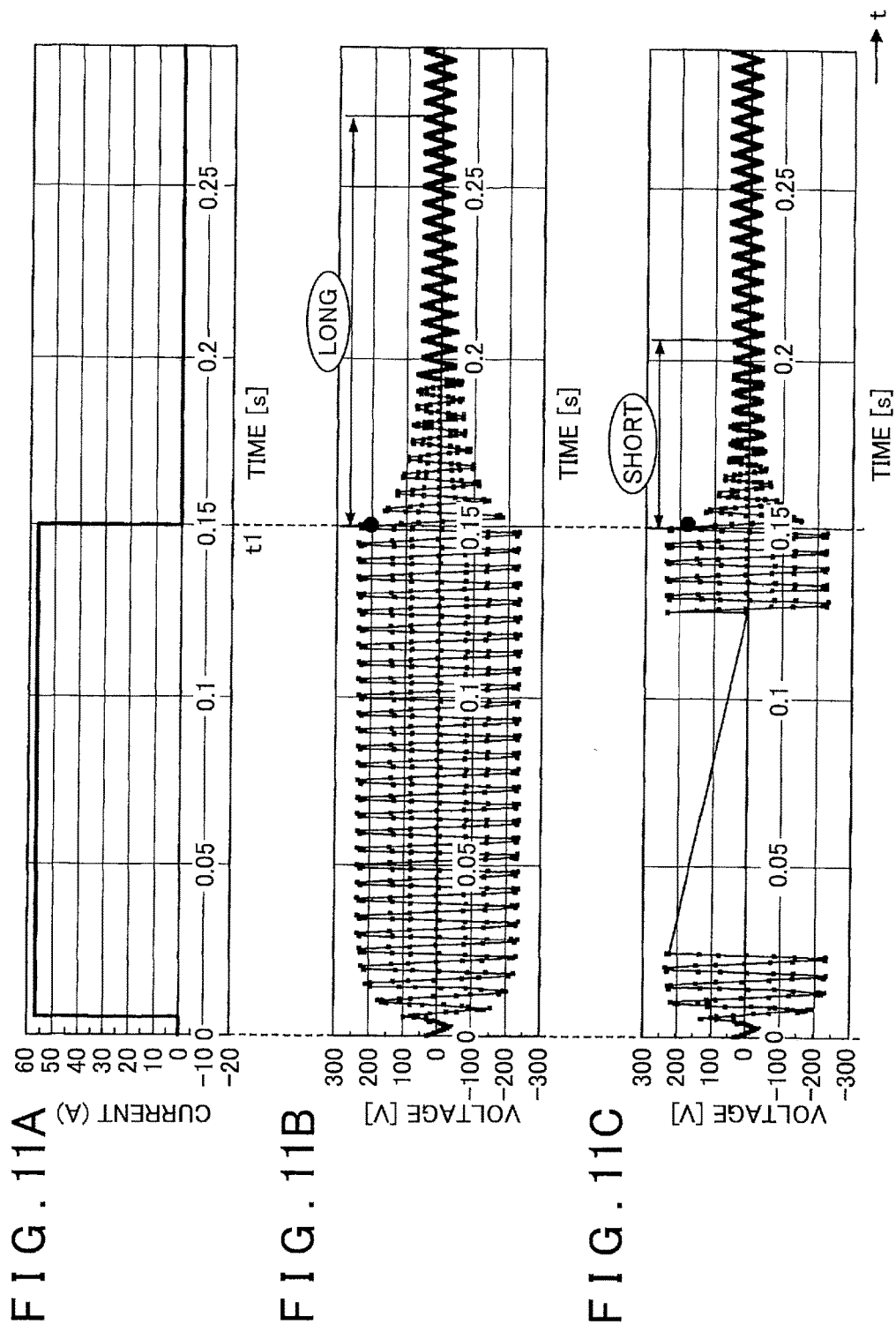

HYBRID EXCITATION ROTATING ELECTRICAL MACHINE

TECHNICAL FIELD

The present invention relates to hybrid excitation rotating electrical machines, and more particularly to hybrid excitation rotating electrical machines using both a permanent magnet and an electromagnet as an exciting circuit.

BACKGROUND ART

Conventionally, hybrid excitation rotating electrical machines including a permanent magnet and an electromagnet are known in the art (see, e.g., Patent Documents 1 and 2). Such a rotating electrical machine includes a rotor and a stator placed radially outward of the rotor to generate a rotating magnetic field rotating the rotor. The stator has a stator core and a stator coil. The rotor has a shaft extending in the axial direction, and first and second cores separated in the axial direction. Each of the first and second cores has permanent magnet excitation magnetic poles that are excited by a permanent magnet, and non-excited permanent magnet non-excitation magnetic poles that are not excited by the permanent magnet, and the permanent magnet excitation magnetic poles and the permanent magnet non-excitation magnetic poles are alternately arranged in the circumferential direction in the radial end of each of the first and second cores. The permanent magnet excitation magnetic poles in the first core and the permanent magnet excitation magnetic poles in the second core have polarities that are inverted with respect to each other. The permanent magnet excitation magnetic poles in the first core are placed so as to face the permanent magnet non-excitation magnetic poles in the second core in the axial direction, and the permanent magnet non-excitation magnetic poles in the first core are placed so as to face the permanent magnet excitation magnetic poles in the second core in the axial direction.

The amount of magnetic flux of the permanent magnet is substantially constant. The rotating electrical machine further includes an exciting coil that excites the permanent magnet non-excitation magnetic poles. When current is applied from the outside to the exciting coil, the exciting coil excites the permanent magnet non-excitation magnetic poles to generate magnetic flux that weakens or strengthen the magnetic flux generated by the permanent magnet. Thus, according to the above rotating electrical machine, the rotor can be appropriately rotated by combined magnetic flux of the magnetic flux of the permanent magnet and the magnetic flux of the electromagnet.

PRIOR ART DOCUMENTS

Patent Documents

[Patent Document 1] Japanese Patent Application Publication No. H08-251891 (JP H08-251891 A)
[Patent Document 2] Japanese Patent No. 3724416

SUMMARY OF THE INVENTION

Problem to be Solved by the Invention

In the rotating electrical machine of Patent Document 1, the exciting coil is placed in a gap formed in the axial direction between the first core and the second core that are separated in the axial direction. In this case, when current is applied to the exciting coil, magnetic flux flows to the shaft on the radially inner side of the exciting coil. In the rotating electrical machine of Patent Document 2, the exciting coil is placed on the outer side in the radial direction between the first core and the second core that are separated in the axial direction. In this case, when current is applied to the exciting coil, magnetic flux flows to the shaft or the first and second cores on the radially inner side of the exciting coil. In the structures of these rotating electrical machines, iron loss that is caused when the magnetic flux is generated by the exciting coil is increased. Thus, the size of the device itself is increased in order to generate large torque.

The present invention was developed in view of the above problems, and it is an object of the present invention to provide a hybrid excitation rotating electrical machine capable of suppressing iron loss that is caused when magnetic flux is generated by an exciting coil exciting magnetic poles that are not excited by a permanent magnet.

Means for Solving the Problem

The above object is achieved by a hybrid excitation rotating electrical machine including: a rotor having a shaft extended on at least one side in an axial direction, and first and second cores that are separated in the axial direction with a gap therebetween, wherein first magnetic poles that are excited by a permanent magnet and second magnetic poles that are not excited by the permanent magnet are alternately arranged in a circumferential direction in each of the first and second cores, the first magnetic poles of the first core have a different polarity from that of the first magnetic poles of the second core, and the first magnetic poles of one of the first and second cores are placed so as to face the second magnetic poles of the other of the first and second cores in the axial direction with the gap therebetween, the hybrid excitation rotating electrical machine further including: a stator that is placed radially outward of the rotor, and that generates a rotating magnetic field rotating the rotor; an exciting coil that is placed in the gap, and that excites the second magnetic poles; and a third core that is placed radially inward of the first core, the second core, and the exciting coil, and that is made of a material having smaller iron loss than the shaft.

Effects of the Invention

According to the present invention, iron loss can be suppressed which is caused when magnetic flux is generated by an exciting coil exciting magnetic poles that are not excited by a permanent magnet.

BRIEF DESCRIPTION OF THE DRAWINGS

FIG. 6 is an exploded perspective view of the hybrid excitation rotating electrical machine according to the embodiment of the present invention.

FIG. 9 shows diagrams showing a portion in which an eddy current generated in a shaft flows.

FIG. 11 shows diagrams illustrating effects of the hybrid excitation rotating electrical machine of the present embodiment.

MODES FOR CARRYING OUT THE INVENTION

A specific embodiment of a hybrid excitation rotating electrical machine according to the present invention will be described below with reference to the accompanying drawings.

Figure 1:
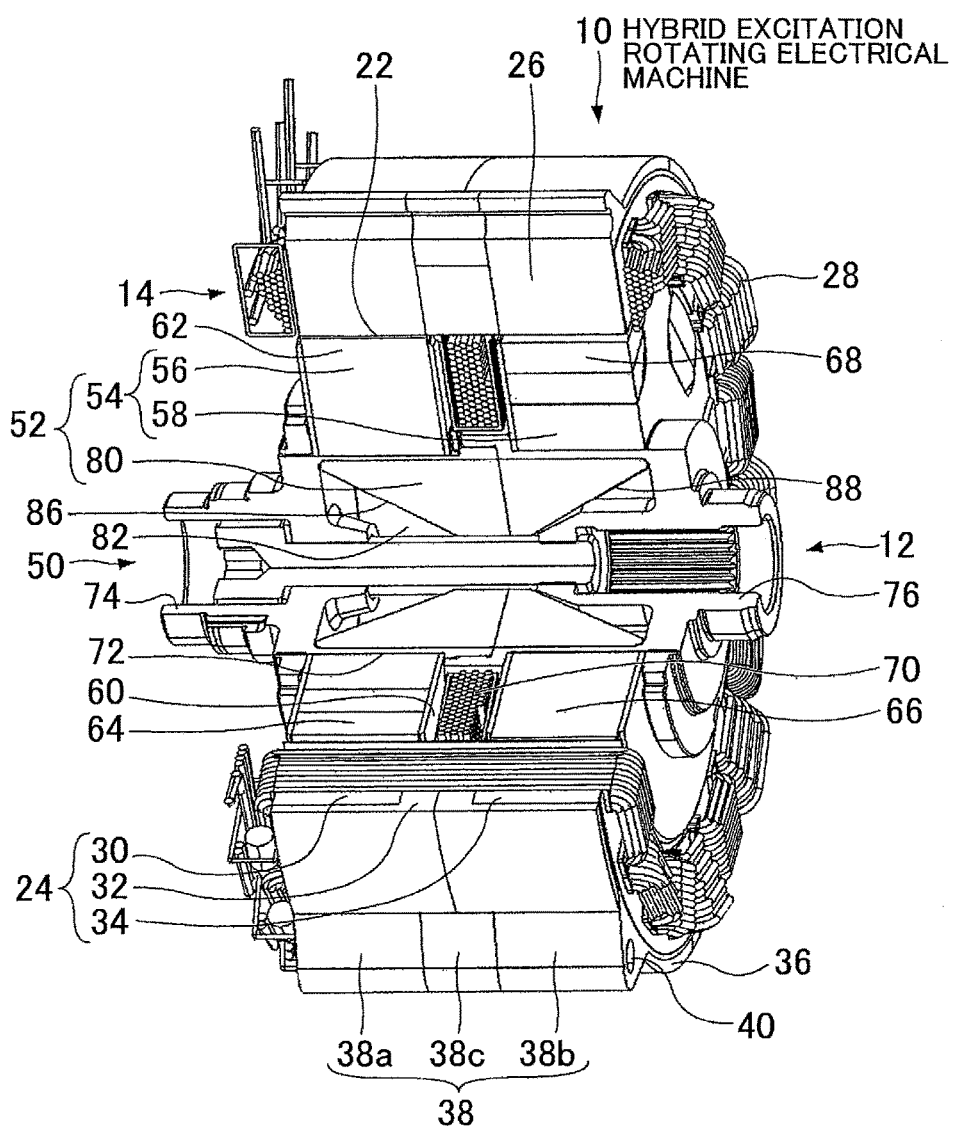
FIG. 1 is a perspective view showing the structure of a hybrid excitation rotating electrical machine according to an embodiment of the present invention.
Figure 2:
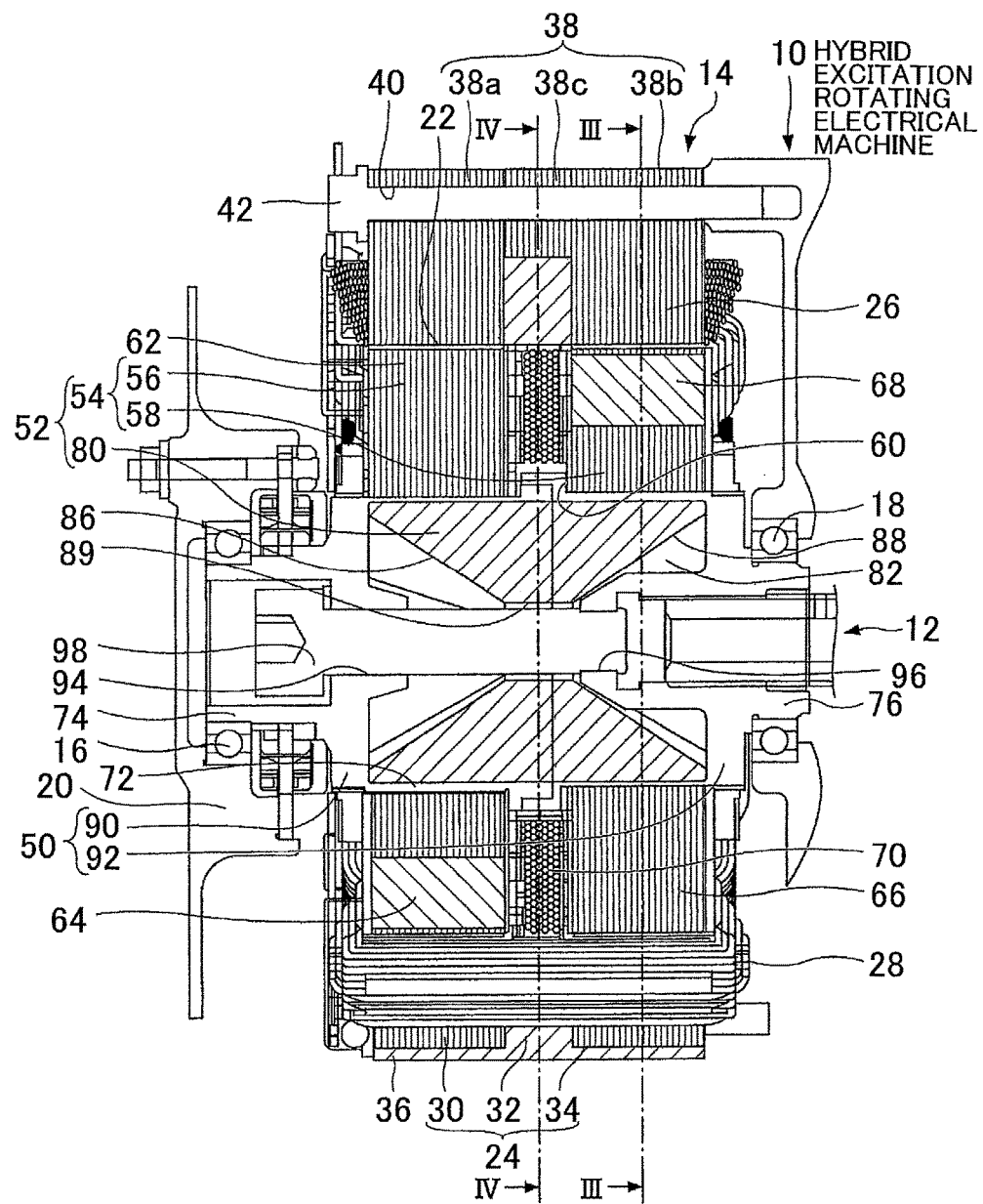
FIG. 2 is a sectional view of the hybrid excitation rotating electrical machine according to the embodiment of the present invention taken along a plane including an axis line.
Figure 3:
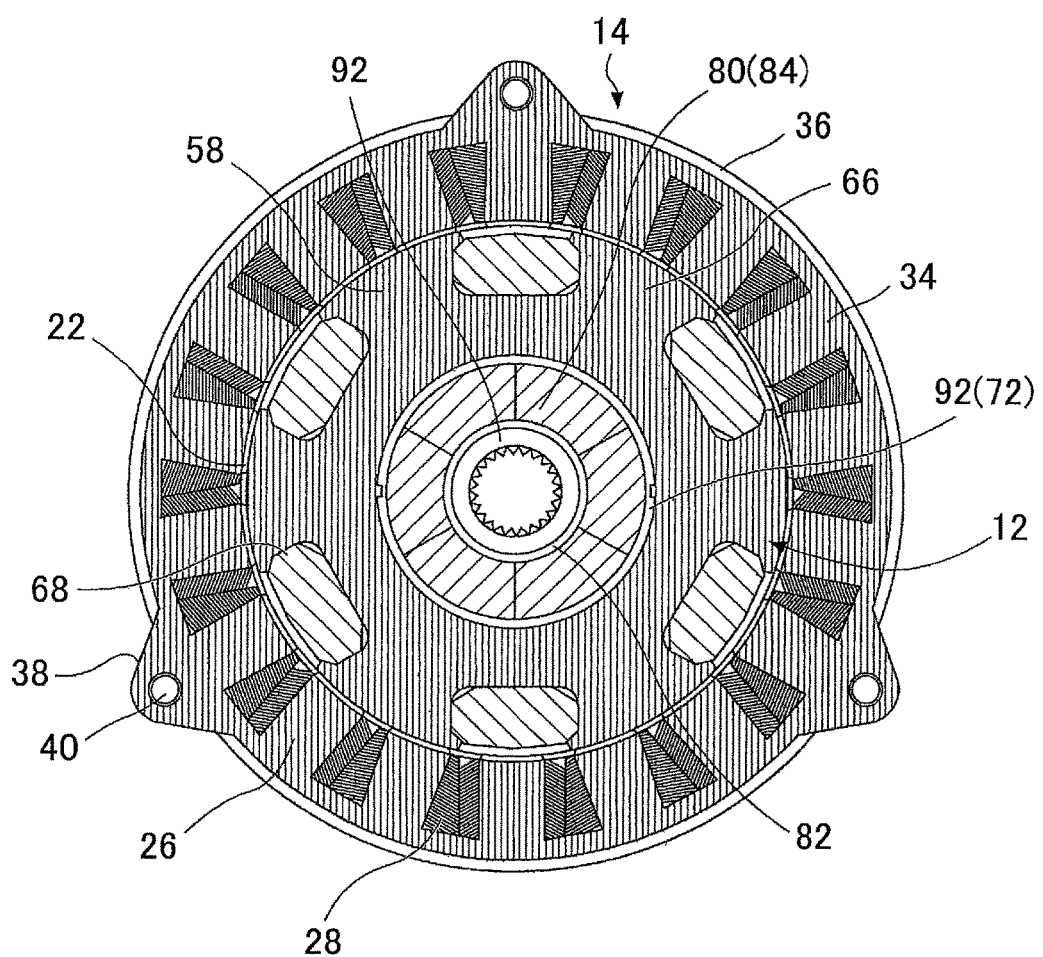
FIG. 3 is a sectional view of the hybrid excitation rotating electrical machine according to the embodiment of the present invention taken along line in FIG. 2.
Figure 4:
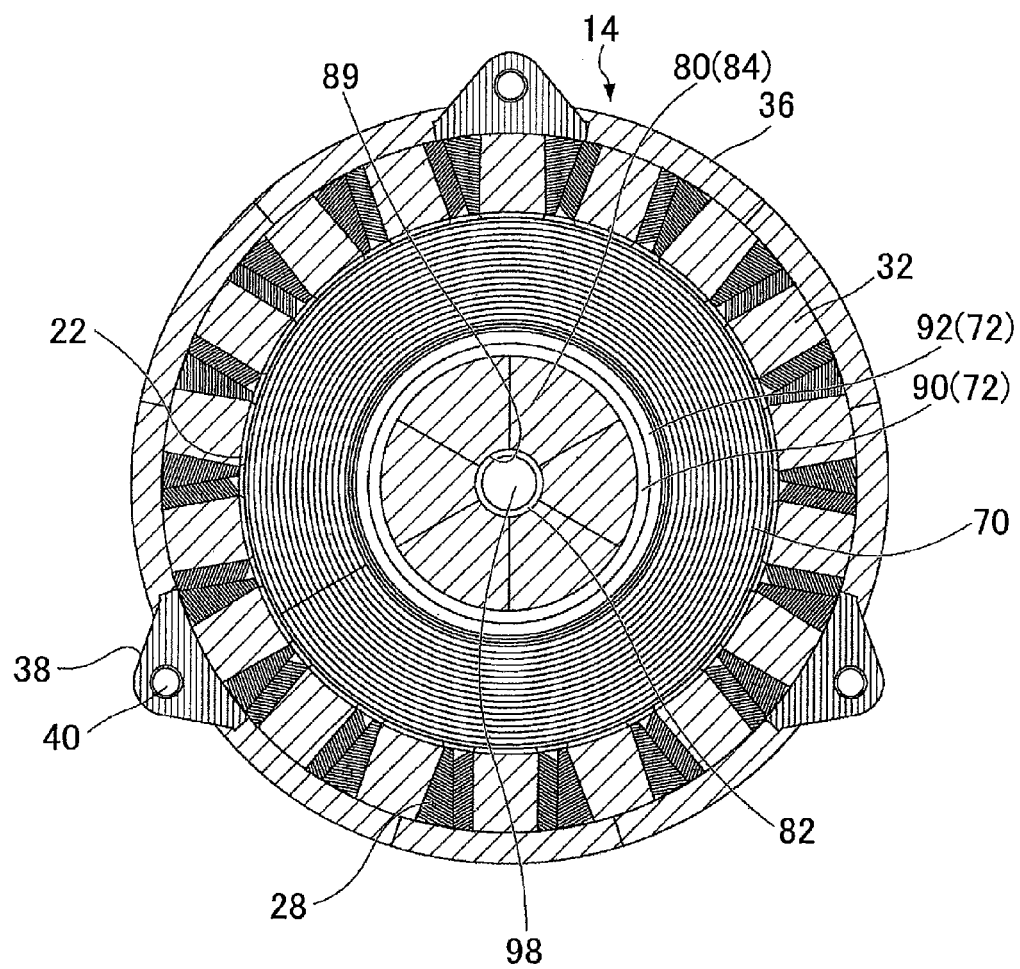
FIG. 4 is a sectional view of the hybrid excitation rotating electrical machine according to the embodiment of the present invention taken along line IV-IV in FIG. 2.

FIG. 1 is a perspective view showing the structure of a hybrid excitation rotating electrical machine 10 according to an embodiment of the present invention. The hybrid excitation rotating electrical machine 10 is shown partially cutaway in FIG. 1. FIG. 2 is a sectional view of the hybrid excitation rotating electrical machine 10 of the present embodiment taken along a plane including an axis line. FIG. 3 is a sectional view of the hybrid excitation rotating electrical machine 10 of the present embodiment taken along line III-III in FIG. 2. FIG. 4 is a sectional view of the hybrid excitation rotating electrical machine 10 of the present embodiment taken along line IV-IV in FIG. 2. FIG. 5 shows sectional views showing the shapes of a rotor core of the hybrid excitation rotating electrical machine 10 of the present embodiment. FIG. 6 is an exploded perspective view of the hybrid excitation rotating electrical machine 10 of the present embodiment.

In the present embodiment, the hybrid excitation rotating electrical machine 10 includes a rotor 12 that is rotatable about an axis, and a stator 14 that generates a rotating magnetic field rotating the rotor 12. The rotor 12 is rotatably supported by a case 20 via bearings 16, 18 at both axial ends. The stator 14 is placed radially outward of the rotor 12, and is fixed to the case 20. The rotor 12 and the stator 14 face each other in the radial direction with an air gap 22 of a predetermined length therebetween.

The stator 14 has a stator core 24 and a stator coil 28. The stator core 24 is formed in a hollow cylindrical shape. A stator tooth 26 is formed on the inner peripheral surface of the stator core 24. The stator tooth 26 protrudes inward in the radial direction of the stator core 24, namely toward the axis. A plurality (e.g., 18) of the stator teeth 26 are provided in the circumferential direction on the inner peripheral surface of the stator core 24, and are arranged at regular intervals along the circumferential direction. The stator coil 28 is wound around each stator tooth 26. A plurality (e.g., 18) of the stator coils 28 are provided in the circumferential direction on the inner peripheral surface of the stator core 24, and are arranged at regular intervals along the circumferential direction. In the case where the hybrid excitation rotating electrical machine 10 is applied to, e.g., a three-phase alternating current (AC) motor, each stator coil 28 forms one of a U-phase coil, a V-phase coil, and a W-phase coil.

The stator core 24 is divided in the axial direction, and has a first stator core 30, a second stator core 32, and a third stator core 34. The first to third stator cores 30 to 34 are formed in a hollow cylindrical shape, and are arranged in the axial direction. The first to third stator cores 30 to 34 have substantially the same inner diameter. The first and third stator cores 30, 34 are placed at both axial ends. The second stator core 32 is placed in the center in the axial direction. The second stator core 32 is interposed between the first stator core 30 and the third stator core 34 in the axial direction, and is bonded and fixed to the end faces of the first and third stator cores 30, 34 which are located closer to the center in the axial direction.

Each of the first and third stator cores 30, 34 is formed by stacking a plurality of insulation coated electromagnetic steel plates in the axial direction. The second stator core 32 is made of a soft magnetic material, specifically a material produced by compression molding insulation coated soft magnetic material powder. The magnetic resistance in the axial direction of the second stator core 32 is lower than that in the axial direction of the first and third stator cores 30, 34.

A cylindrical yoke 36 that supports the first to third stator cores 30 to 34 is provided radially outward of the stator core 24. Like the second stator core 32, the yoke 36 is made of a material produced by compression molding insulation coated soft magnetic material powder. The magnetic resistance in the axial direction of the yoke 36 is lower than that in the axial direction of the first and third stator cores 30, 34. The yoke 36 may be integral with the second stator core 32. The yoke 36 is bonded and fixed to the radially outer surfaces of the first stator core 30 and the third stator core 34. The first stator core 30 and the third stator core 34 are magnetically coupled together by the yoke 36. The stator teeth 26 are provided in each of the first to third stator cores 30 to 34, and the stator teeth 26 of each of the first to third stator cores 30 to 34 are provided so as to be arranged next to each other in the axial direction. Each stator coil 28 is formed so as to extend through the first to third stator cores 30 to 34 in the axial direction.

The stator core 24 has an attachment portion 38 that protrudes to the radially outer side and that attaches and fixes the stator 14 to the case 20. The attachment portion 38 is formed by a plurality of electromagnetic steel plates that are stacked in the axial direction. The attachment portion 38 has an attachment portion 38a formed integrally with the first stator core 30, an attachment portion 38b formed integrally with the third stator core 34, and an attachment portion 38c interposed between the attachment portions 38a, 38b. The attachment portion 38c is placed radially outward of the second stator core 32. The attachment portion 38c may be formed integrally with the second stator core 32 instead of being formed by the plurality of electromagnetic steel plates that are stacked in the axial direction. A plurality (e.g., 3) of the attachment portions 38 are provided in the circumferential direction. A through hole 40 is provided in each attachment portion 38 so as to extend therethrough in the axial direction. The stator 14 is fixed to the case 20 by tightening into the case 20 bolts 42 extending through the through holes 40 of the attachment portions 38.

The rotor 12 is placed radially inward of the stator 14. The rotor 12 has a shaft 50 and a rotor core 52. The shaft 50 extends in the axial direction, and extends beyond the axial ends of the stator 14 at its both axial ends. The shaft 50 need only be formed so that at least one axial end of the shaft 50 extends beyond the axial end of the stator 14. The shaft 50 is made of a material having predetermined iron loss, specifically carbon steel such as S45C. The rotor core 52 has a radially outer rotor core 54 that is placed radially outward of the shaft 50 so as to be supported by the shaft 50. The radially outer rotor core 54 is formed in a hollow cylindrical shape, and is fixed to the radially outer surface of the shaft 50.

The radially outer rotor core 54 is divided in the axial direction, and has a first radially outer rotor core 56 and a second radially outer rotor core 58. The first and second radially outer rotor cores 56, 58 are formed in a hollow cylindrical shape, and are placed radially outward of the shaft 50 so as to be supported by the shaft 50. Each of the first and second radially outer rotor cores 56, 58 is formed by a plurality of insulation coated electromagnetic steel plates that are stacked in the axial direction. The first radially outer rotor core 56 and the second radially outer rotor core 58 are separated from each other in the axial direction with an annular gap 60 therebetween.

The radially outer surface of the first radially outer rotor core 56 faces the radially inner surface of the first stator core 30 in the radial direction. That is, the radially outer surface of the first radially outer rotor core 56 and the radially inner surface of the first stator core 30 face each other in the radial direction. The radially outer surface of the second radially outer rotor core 58 faces the radially inner surface of the third stator core 34 in the radial direction. That is, the radially outer surface of the second radially outer rotor core 58 and the radially inner surface of the third stator core 34 face each other in the radial direction. The gap 60 faces the radially inner surface of the second stator core 32, and is provided radially inward of the second stator core 32.

A rotor tooth 62 is formed in the outer periphery of the first radially outer rotor core 56. The rotor tooth 62 protrudes outward in the radial direction of the first radially outer rotor core 56. A plurality (e.g., 6) of the rotor teeth 62 are provided in the circumferential direction on the outer peripheral surface of the first radially outer rotor core 56, and are arranged at regular intervals along the circumferential direction.

A permanent magnet 64 is attached between the rotor teeth 62 adjoining each other in the circumferential direction, so as to adjoin the rotor teeth 62. The permanent magnet 64 is placed radially outward of the first radially outer rotor core 56. The permanent magnet 64 is, e.g., a ferrite magnet. A plurality (e.g., 6) of the permanent magnets 64 are provided in the circumferential direction, and are provided at regular intervals along the circumferential direction. Each permanent magnet 64 has a predetermined width (angle) in the circumferential direction, and has a predetermined radial thickness. Each permanent magnet 64 is magnetized with a predetermined polarity (e.g., the radially outer side is N pole and the radially inner side is S pole).

The radially outer end face of the permanent magnet 64 and the radially outer end face of the rotor tooth 62 are formed at substantially the same distance from the axis. The first radially outer rotor core 56 has permanent magnet excitation magnetic poles that are excited by the permanent magnets 64, and non-excited permanent magnet non-excitation magnetic poles that are not excited by the permanent magnets 64. The permanent magnet non-excitation magnetic poles are formed in the rotor teeth 62. The permanent magnet excitation magnetic poles and the permanent magnet non-excitation magnetic poles are alternately arranged in the circumferential direction. The first radially outer rotor core 56 has a magnetic pole of a different polarity at every predetermined angle, and has a predetermined number (e.g., 12) of magnetic poles in the circumferential direction by the permanent magnet excitation magnetic poles and the permanent magnet non-excitation magnetic poles.

A rotor tooth 66 is formed in the outer periphery of the second radially outer rotor core 58. The rotor tooth 66 protrudes outward in the radial direction of the second radially outer rotor core 58. A plurality (e.g., 6) of the rotor teeth 66 are provided in the circumferential direction on the outer peripheral surface of the second radially outer rotor core 58, and are arranged at regular intervals along the circumferential direction.

A permanent magnet 68 is attached between the rotor teeth 66 adjoining each other in the circumferential direction, so as to adjoin the rotor teeth 66. The permanent magnet 68 is placed radially outward of the second radially outer rotor core 58. The permanent magnet 68 is, e.g., a ferrite magnet. A plurality (e.g., 6) of the permanent magnets 68 are provided in the circumferential direction, and are provided at regular intervals along the circumferential direction. Each permanent magnet 68 has a predetermined width (angle) in the circumferential direction, and has a predetermined radial thickness. Each permanent magnet 68 is magnetized with a predetermined polarity different from that of the permanent magnet 64 (e.g., the radially outer side is S pole and the radially inner side is N pole). That is, the permanent magnet 68 and the permanent magnet 64 have polarities that are inverted with respect to each other.

The radially outer end face of the permanent magnet 68 and the radially outer end face of the rotor tooth 66 are formed at substantially the same distance from the axis. The second radially outer rotor core 58 has permanent magnet excitation magnetic poles that are excited by the permanent magnets 68, and non-excited permanent magnet non-excitation magnetic poles that are not excited by the permanent magnets 68. The permanent magnet non-excitation magnetic poles are formed in the rotor teeth 66. The permanent magnet excitation magnetic poles and the permanent magnet non-excitation magnetic poles are alternately arranged in the circumferential direction. The second radially outer rotor core 58 has a magnetic pole of a different polarity at every predetermined angle, and has the same predetermined number (e.g., 12) of magnetic poles as the first radially outer rotor core 56 in the circumferential direction by the permanent magnet excitation magnetic poles and the permanent magnet non-excitation magnetic poles.

The permanent magnet excitation magnetic poles of the first radially outer rotor core 56 are arranged so as to face the permanent magnet non-excitation magnetic poles of the second radially outer rotor core 58 in the axial direction with the gap 60 therebetween. That is, the permanent magnets 64 of the first radially outer rotor core 56 are arranged so as to face the rotor teeth 66 of the second radially outer rotor core 58 in the axial direction with the gap 60 therebetween. The permanent magnet non-excitation magnetic poles of the first radially outer rotor core 56 are arranged so as to face the permanent magnet excitation magnetic poles of the second radially outer rotor core 58 in the axial direction with the gap 60 therebetween. That is, the rotor teeth 62 of the first radially outer rotor core 56 are arranged so as to face the permanent magnets 68 of the second radially outer rotor core 58 in the axial direction with the gap 60 therebetween.

An exciting coil 70 that excites the permanent magnet non-excitation magnetic poles of the rotor teeth 62, 66 is placed in the gap 60, namely between the first radially outer rotor core 56 and the second radially outer rotor core 58 in the axial direction. The exciting coil 70 fills almost the entire region of the gap 60. The exciting coil 70 is formed in an annular shape around the shaft 50, and is wound in a toroidal form. The exciting coil 70 is placed radially outward of the shaft 50, is placed radially inward of the second stator core 32, and faces the second stator core 32 in the radial direction. The exciting coil 70 is attached and fixed to the stator 14 (specifically, the stator core 24 thereof). A direct current (DC exciting current) is supplied to the exciting coil 70. When the direct current is supplied to the exciting coil 70, magnetic flux (DC exciting magnetic flux) is generated which extends through the radially inner side (the axis side) of the exciting coil 70 in the axial direction. The magnetic flux is generated in an amount corresponding to the direct current supplied to the exciting coil 70.

Fixing of the exciting coil 70 to the stator 14 may be implemented by direct bonding of the exciting coil 70 and the stator 14. Fixing of the exciting coil 70 to the stator 14 may be implemented by providing in the circumferential direction a plurality of U-shaped holding members (clips) 71 that hold the annular exciting coil 70 from the radially inner side, and inserting and hanging pawl portions on both sides of each holding member 71 in holes that are formed in the radially inner surface of the second stator core 32 or holes that are formed in the opposing axial end faces of the first and third stator cores 30, 34 of the stator core 24. FIG. 6 shows the state where the exciting coil 70 is fixed to the stator 14 by the plurality of holding members 71 provided in the circumferential direction.

The shaft 50 is formed in a hollow shape. The shaft 50 has a large diameter cylindrical portion 72 having a relatively large diameter, and small diameter cylindrical portions 74, 76 having a relatively small diameter. The small diameter cylindrical portions 74, 76 are provided at both axial ends. The small diameter cylindrical portions 74, 76 of the shaft 50 are supported by the case 20 via the bearings 16, 18. The large diameter cylindrical portion 72 is provided in the center in the axial direction, and is interposed between the small diameter cylindrical portions 74, 76 at both axial ends. The first and second radially outer rotor cores 56, 58 are placed radially outward of the large diameter cylindrical portion 72 so as to be supported by the large diameter cylindrical portion 72, and are fixed to the radially outer surface of the large diameter cylindrical portion 72.

The rotor core 52 has a radially inner rotor core 80 that is placed radially inward of the shaft 50 so as to be supported by the shaft 50. The radially inner rotor core 80 is placed radially inward of the first radially outer rotor core 56 and the second radially outer rotor core 58 of the rotor core 52 and the exciting coil 70. A hollow space 82 is formed in the large diameter cylindrical portion 72 of the shaft 50. The radially inner rotor core 80 is accommodated in the hollow space 82 of the large diameter cylindrical portion 72, and is bonded and fixed to the radially inner surface of the large diameter cylindrical portion 72. The radially inner rotor core 80 is made of a material produced by compression molding a soft magnetic material, specifically insulation coated soft magnetic material powder. The radially inner rotor core 80 is made of a material having smaller iron loss than the shaft 50.

The radially inner rotor core 80 is divided in the circumferential direction, and is formed by a plurality (e.g., 6) of rotor core pieces 84 each formed in a sector shape as viewed in the axial direction. The division of the radially inner rotor core 80 in the circumferential direction is performed at regular intervals (equal angles) in the circumferential direction, and the rotor core pieces 84 have the same shape. The number of pieces into which the radially inner rotor core 80 is divided in the circumferential direction, namely the number of rotor core pieces 84, is the number of poles of the first and second radially outer rotor cores 56, 58 in the radially outer rotor core 54, or a divisor of the number of poles. For example, in the case where the number of poles is "12," the radially inner rotor core 80 is divided into "2," "3," "4," "6," or "12" pieces (in FIGS. 3 and 4, the radially inner rotor core 80 is divided into "6" pieces).

The division of the radially inner rotor core 80 in the circumferential direction is performed along the lines extending through the axis of the rotor 12 and the shaft 50 and the circumferential centers of at least two of the permanent magnets 64, 68 and the rotor teeth 62, 66 (that is, the permanent magnet excitation magnetic poles and the permanent magnet non-excitation magnetic poles) which are alternately arranged in the circumferential direction in the first and second radially outer rotor cores 56, 58 of the rotor 12. That is, each plane including the plane that divides the radially inner rotor core 80 in the circumferential direction extends through the axis of the rotor 12 and the shaft 50 and through the circumferential center of any of the permanent magnets 64, 68 and the rotor teeth 62, 66 (that is, the permanent magnet excitation magnetic poles and the permanent magnet non-excitation magnetic poles).

Figure 5A:
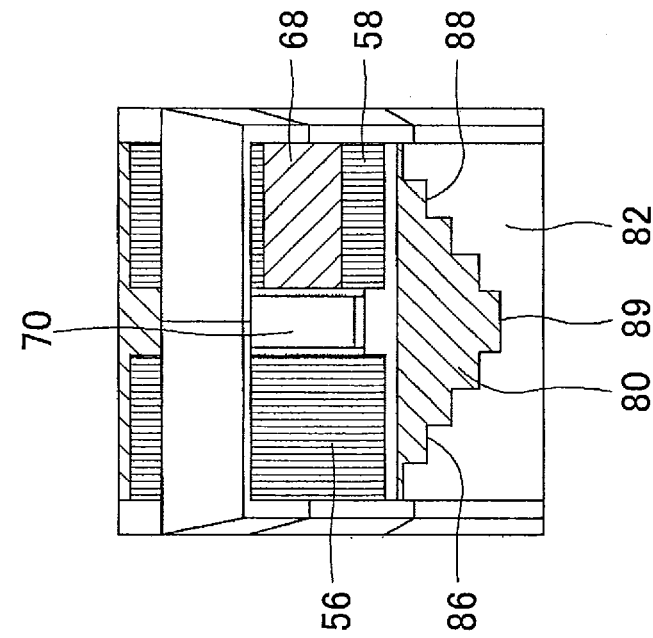
FIG. 5 shows sectional views showing the shapes of a third core of the hybrid excitation rotating electrical machine according to the embodiment of the present invention.
Figure 5B:
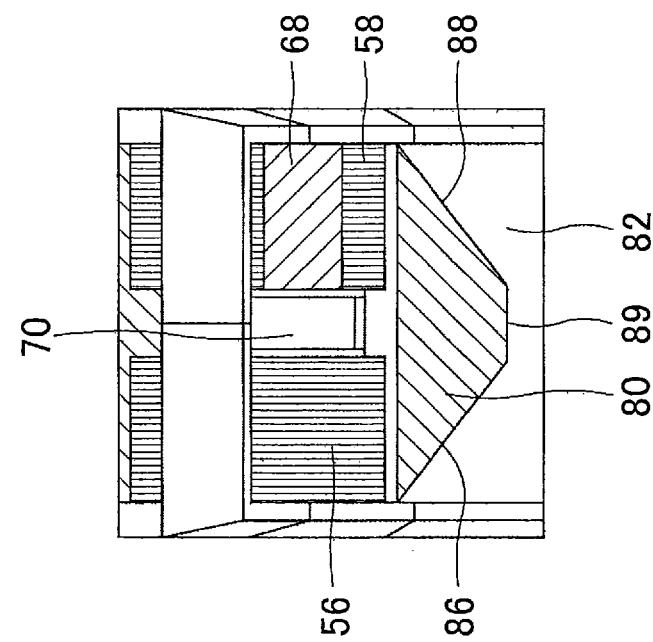

The radially inner rotor core 80 has notch holes 86, 88 extending in the axial direction in its axial ends. The notch holes 86, 88 are provided at both axial ends. Each of the notch holes 86, 88 is formed in a tapered shape as shown in FIG. 5A or in a stair-like shape as shown in FIG. 5B so that its diameter decreases from the axial end face toward the axial center. The diameter at the axial end (the shallowest portion) of the notch hole 86, 88 substantially matches the inner diameter of the large diameter cylindrical portion 72 of the shaft 50, and the diameter in the axial central portion (the deepest portion) of the notch hole 86, 88 is a predetermined diameter. The radially inner rotor core 80 has a predetermined radial thickness in the axial central portion, and has a smaller radial thickness at both axial ends than in the axial central portion. The radial thickness of the large diameter cylindrical portion 72 of the shaft 50 is set so as to maintain the strength required to transfer motor torque, and the radial thickness of the axial central portion of the radially inner rotor core 80 is set to the predetermined thickness that does not allow the magnetic flux generated by the exciting coil 70 to be saturated. Thus, the radial thickness of the axial central portion of the radially inner rotor core 80 is larger than that of the large diameter cylindrical portion 72 of the shaft 50.

The notch hole 86 and the notch hole 88 communicate with each other in the center in the axial direction, and are connected together at their deepest portions through a through hole 89 extending through the rotor core 80 in the axial direction. That is, the radially inner rotor core 80 is formed in a hollow shape so as to have the through hole 89. All of the notch holes 86, 88 and the through hole 89 of the radially inner rotor core 80 are provided on the axis line of the shaft 50. The through hole 89 of the radially inner rotor core 80 has substantially the same diameter as the deepest portions of the notch holes 86, 88.

The rotor 12 is divided into two portions in the axial direction. The shaft 50 is divided into two portions in the axial direction, and is formed by two cup-shaped members 90, 92 that are fitted together. The shaft 50 is divided in the axial direction substantially along the center in the axial direction. The cup-shaped member 90 has the small diameter cylindrical portion 74 and a part of the large diameter cylindrical portion 72 (specifically, a half connected to the small diameter cylindrical portion 74). The cup-shaped member 92 has the small diameter cylindrical portion 76 and a part of the large diameter cylindrical portion 72 (specifically, a half connected to the small diameter cylindrical portion 76). The shaft 50 is formed by fitting the cup-shaped member 90 and the cup-shaped member 92 together. The first radially outer rotor core 56 is supported by the cup-shaped member 90, and the second radially outer rotor core 58 is supported by the cup-shaped member 92. The first radially outer rotor core 56 is fixed to the radially outer surface of the cup-shaped member 90, and the second radially outer rotor core 58 is fixed to the radially outer surface of the cup-shaped member 92.

Bolt holes 94, 96 extending in the axial direction on the axis are formed in the cup-shaped members 90, 92, respectively. The bolt holes 94, 96 have substantially the same diameter as the through hole 89 of the radially inner rotor core 80. A bolt 98 is inserted in the bolt holes 94, 96 of the cup-shaped members 90, 92 and the through hole 89 of the radially inner rotor core 80. The cup-shaped member 90 and the cup-shaped member 92 are fitted together, and are fastened together by the bolt 98.

The radially inner rotor core 80 may be divided into two portions in the axial direction. In this case, the radially inner rotor core 80 may be divided in the axial direction at a position corresponding to the position where the shaft 50 is divided in the axial direction, or substantially along the center in the axial direction. One of the divided two portions of the radially inner rotor core 80 is bonded and fixed to the radially inner surface of the cup-shaped member 90 of the shaft 50, and the other divided portion of the radially inner rotor core 80 is bonded and fixed to the radially inner surface of the cup-shaped member 92.

If a direct current is supplied to the annular exciting coil 70 in the above structure of the hybrid excitation rotating electrical machine 10, magnetic flux is generated which extends through the radially inner side (the axis side) of the exciting coil 70 in the axial direction. The magnetic flux generated by the electromagnet using the exciting coil 70 flows through the permanent magnet non-excitation magnetic poles of the first or second radially outer rotor core 56, 58, the radially inner rotor core 80, the permanent magnet non-excitation magnetic poles of the second or first radially outer rotor core 58, 56, the air gap 22, the stator core 24, the air gap 22, and the permanent magnet non-excitation magnetic poles of the first or second radially outer rotor core 56, 58 in this order. If such magnetic flux is generated, the permanent magnet non-excitation magnetic poles of the first and second radially outer rotor cores 56, 58 are excited. The magnetic flux thus generated by the electromagnet weakens or strengthens the magnetic flux generated by the permanent magnets 46, 68. The amount of magnetic flux generated by the electromagnet is adjusted according to the magnitude of the direct current that is applied to the exciting coil 70.

Thus, according to the present embodiment, torque that rotates the rotor 12 about the stator 14 can be adjusted by the combined magnetic flux of the magnetic flux generated by the permanent magnets 64, 68 and the magnetic flux generated by the electromagnet using the exciting coil 70, whereby the rotor 12 can be appropriately rotated.

In the structure of the hybrid excitation rotating electrical machine 10 of the present embodiment, the magnetic flux that is generated by excitation of the exciting coil 70 flows through the radially inner rotor core 80 placed radially inward of the shaft 50, on the radially inner side (the axis side) of the radially outer rotor core 54 (specifically, the first and second radially outer rotor cores 56, 58) and the exciting coil 70 that are placed radially outward of the shaft 50. Unlike the structure in which the radially inner rotor core 80 is not provided radially inward of the shaft 50, this structure suppress flowing of the magnetic flux, which flows in the axial direction on the radially inner side of the exciting coil 70 by excitation of the exciting coil 70, in the shaft 50 itself (specifically, the large diameter cylindrical portion 72 etc.).

Since the radially inner rotor core 80 is made of a material having smaller iron loss than the shaft 50, iron loss of the radially inner rotor core 80 is smaller than that of the shaft 50. Thus, the structure of the hybrid excitation rotating electrical machine 10 of the present embodiment can suppress iron loss that is caused when the magnetic flux is generated by the exciting coil 70. Accordingly, torque that rotates the rotor 12 can be efficiently generated, and a torque increase upon rotating the rotor 12 can be implemented. This can suppress an increase in size of the device itself in order to generate large torque.

In the structure of the hybrid excitation rotating electrical machine 10 of the present embodiment, the radially inner rotor core 80 having smaller iron loss than the shaft 50 is made of a soft magnetic material (specifically, compressed soft magnetic material powder). This radially inner rotor core 80 is placed radially inward of the shaft 50, and is bonded and fixed to the radially inner surface of the large diameter cylindrical portion 72 of the shaft 50. In this structure, the radially inner rotor core 80 is not interposed in a portion where large load (torque, centrifugal force, axial force, etc.) is generated. Specifically, the radially inner rotor core 80 is present outside a torque transfer path in the rotor 12. This can prevent breakage of the radially inner rotor core 80 due to torque transfer. The radially inner rotor core 80 is present radially inward of the shaft 50. Thus, the radially inner rotor core 80 is less susceptible to centrifugal force as compared to the structure in which the radially inner rotor core 80 is disposed radially outward of the rotor 12. This can prevent breakage or scattering of the radially inner rotor core 80 due to the centrifugal force.

The radially inner rotor core 80 is divided in the circumferential direction. Thus, the radially inner rotor core 80 is less susceptible to centrifugal force as compared to the structure in which the radially inner rotor core 80 is integrated along the entire circumference. This can prevent breakage or scattering of the radially inner rotor core 80 due to the centrifugal force.

The radially inner rotor core 80 is divided at regular intervals in the circumferential direction, and the number of pieces into which the radially inner rotor core 80 is divided in the circumferential direction is the number of poles of the first and second radially outer rotor cores 56, 58 in the radially outer rotor core 54, or a divisor of the number of poles. The division of the radially inner rotor core 80 in the circumferential direction is performed along the lines extending through the axis of the rotor 12 and the shaft 50 and the circumferential centers of at least two of the permanent magnets 64, 68 and the rotor teeth 62, 66 (that is, the permanent magnet excitation magnetic poles and the permanent magnet non-excitation magnetic poles) which are alternately arranged in the circumferential direction in the first and second radially outer rotor cores 56, 58 of the rotor 12. In this structure, a gap is formed between the two rotor core pieces 84 adjoining each other in the circumferential direction of the radially inner rotor core 80, but a magnetic path that is desirable to rotate the rotor 12 can be maintained without blocking the path of the magnetic flux that is generated by the permanent magnets 64, 68 and the path of the magnetic flux that is generated by the electromagnet using the exciting coil 70.

The magnetic flux that flows radially inward of the exciting coil 70 by excitation of the exciting coil 70 flows through the first or second radially outer rotor core 56, 58 of the radially outer rotor core 54, the radially inner rotor core 80, the second or first radially outer rotor core 58, 56, the air gap 22, the stator core 24, the air gap 22, and the first or second radially outer rotor core 56, 58. At this time, the axial ends of the radially inner rotor core 80 which face the first and second radially outer rotor cores 56, 58 in the radial direction have high magnetic flux density in a radially outer portion, and have low magnetic flux in a radially inner portion (in a portion near the axis).

In the present embodiment, the radially inner rotor core 80 has the notch holes 86, 88 extending in the axial direction in its axial ends. This can eliminate an unnecessary portion of the radially inner rotor core 80 which does not perform the function of the radially inner rotor core 80. Thus, as compared to the structure in which the notch holes 86, 88 are not present, the weight of the inner-side rotor core 80 can be reduced while minimizing the influence on the flow of the magnetic flux, and the cost can be reduced.

In the present embodiment, the rotor core 52 is divided in the axial direction, and the shaft 50 is divided in the axial direction. In this structure, after manufacturing the stator 14 including the exciting coil 70 that protrudes from the radially inner surface of the stator core 24 toward the axis, the rotor 12 can be attached from both sides of the stator 14 so that the stator 14 is interposed between the divided portions of the rotor core 52 and the divided portions of the shaft 50. This facilitates assembly of the hybrid excitation rotating electrical machine 10.

Figure 7B:
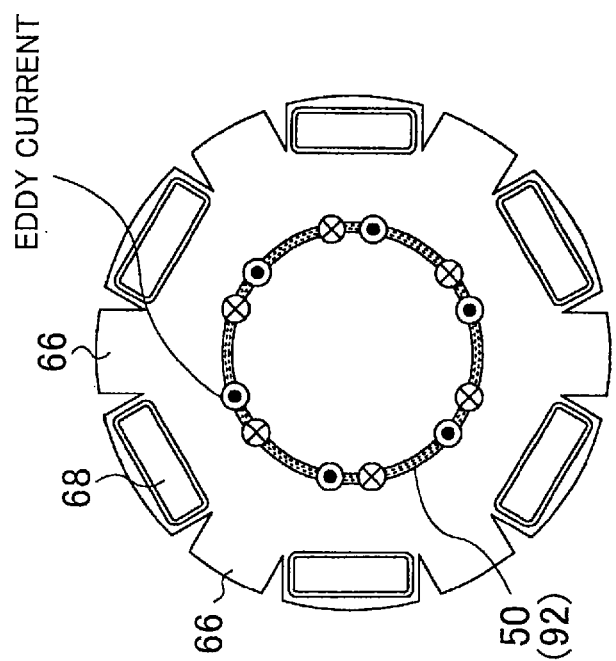
FIG. 7 shows diagrams illustrating a phenomenon that can occur in the structure of such a hybrid excitation rotating electrical machine as in the embodiment.
Figure 7A:
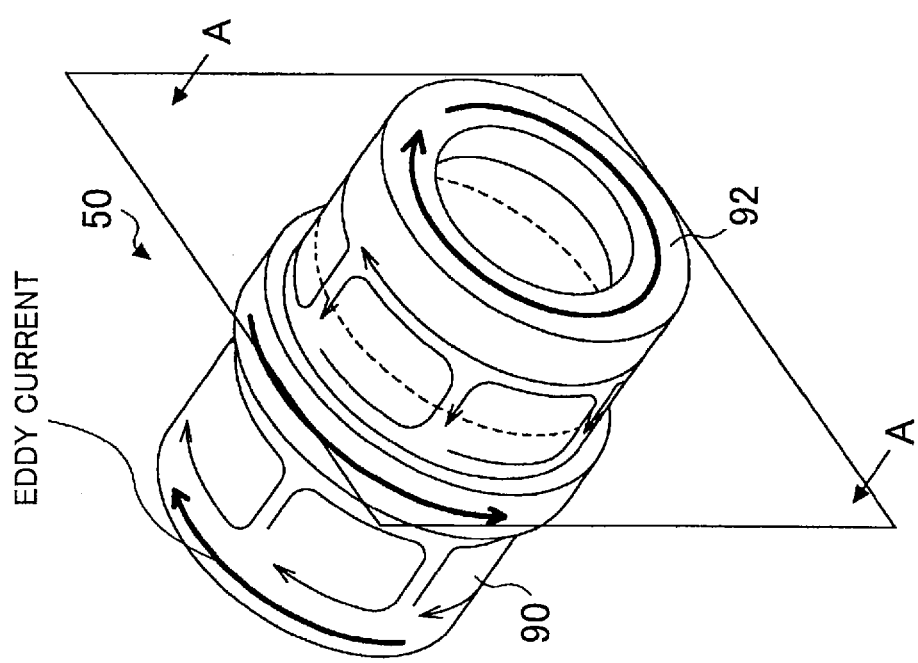
Figure 8A:
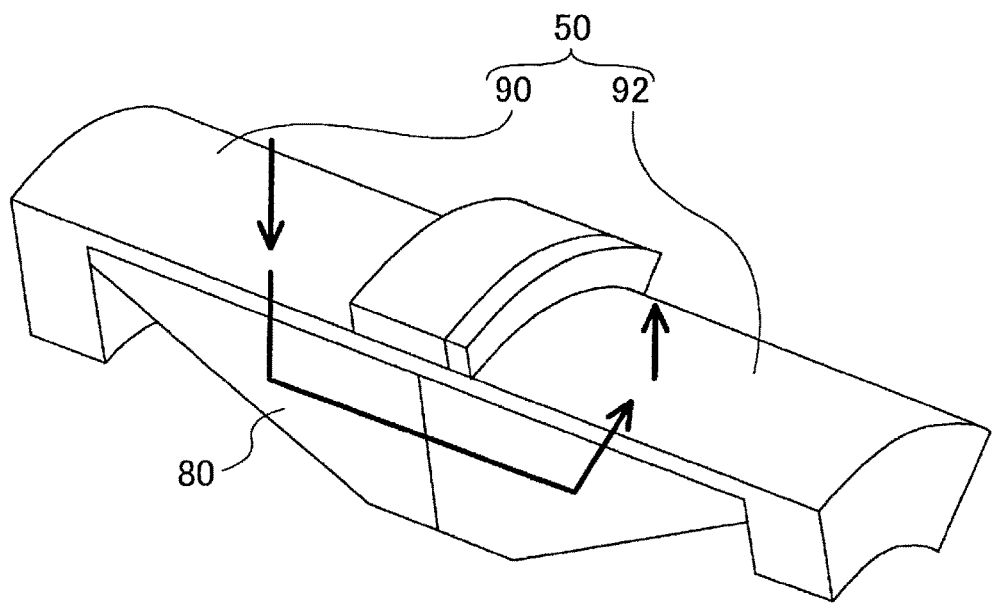
FIG. 8 shows diagrams illustrating a phenomenon that can occur in the structure of such a hybrid excitation rotating electrical machine as in the embodiment.
Figure 8B:
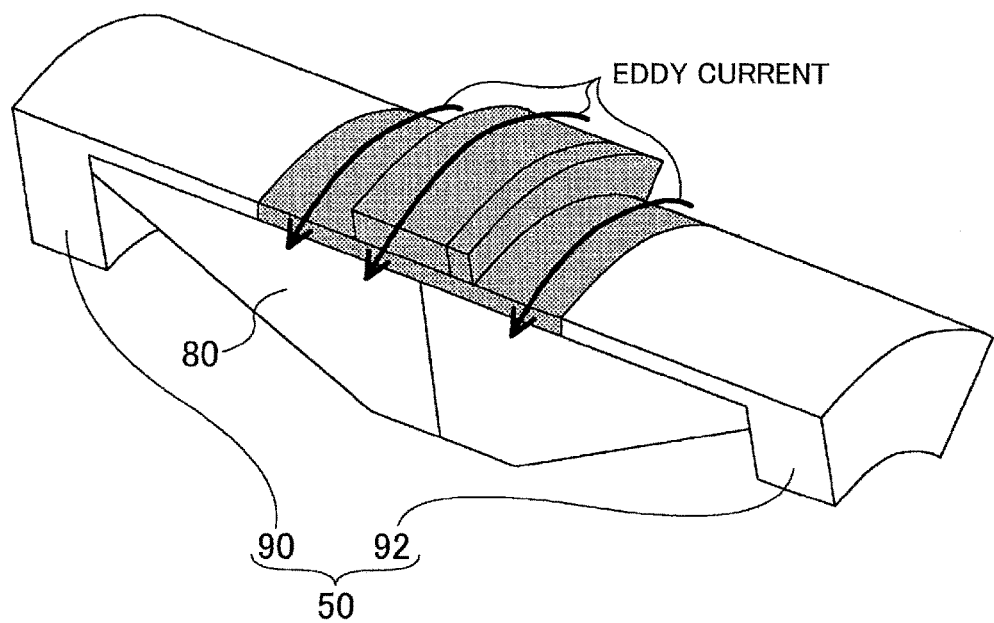

FIGS. 7 and 8 are diagrams illustrating a phenomenon that can occur in the structure of such a hybrid excitation rotating electrical machine 10 as in the present embodiment. FIG. 7A is a perspective view of the shaft 50 of the rotor 12, and FIG. 7B is a sectional view of the shaft 50 and its surrounding portion, taken along line A-A in FIG. 7A. FIG. 8A is a diagram showing how magnetic flux flows in the shaft 50 and the radially inner rotor core 80 after an exciting current to the exciting coil 70 is decreased suddenly. FIG. 8B is a diagram showing how an eddy current is generated in the shaft 50 after the exciting current to the exciting coil 70 is decreased suddenly. FIG. 9 shows diagrams showing a portion in which an eddy current generated in the shaft 50 flows. FIG. 9A is a side view of the shaft 50 and its surrounding portion, and FIG. 9B is a sectional view of the shaft and its surrounding portion, taken along line B-B in FIG. 9A.

In the present embodiment, as described above, the exciting coil 70 that excites the permanent magnet non-excitation magnetic poles of the rotor teeth 62, 66 is placed between the first radially outer rotor core 56 and the second radially outer core 58 of the radially outer rotor core 54 in the axial direction, and this exciting coil 70 is formed in an annular shape around the shaft 50. The radially inner rotor core 80, which is made of a material produced by compression molding insulation coated soft magnetic material powder, is placed radially inward of the shaft 50 formed in a hollow shape. The radially outer rotor core 54, which is formed by stacking a plurality of insulation coated electromagnetic steel plates in the axial direction, is placed radially outward of the shaft 50. The radially inner rotor core 80 is made of a material having smaller iron loss than the shaft 50.

In the above structure, if a DC exciting current is supplied to the exciting coil 70, DC exciting magnetic flux is generated which extends through the radially inner side (the axis side) of the exciting coil 70 in the axial direction, and this DC exciting magnetic flux flows through the shaft 50. Since the DC exciting current that is supplied to the exciting coil 70 is controlled to a predetermined magnitude by switching, it includes a harmonic component. Accordingly, as the DC exciting magnetic flux that is generated around the exciting coil 70 fluctuates according to a change in DC exciting current, an eddy current may be generated in a part of the magnetic path which has small electrical resistance (specifically, the shaft 50) (see FIG. 7). This may increase loss.

The region in which the eddy current may be generated in this case is a region near a part of the shaft 50 which is sandwiched in the axial direction between the first radially outer rotor core 56 and the second radially outer rotor core 58 of the radially outer rotor core 54 (specifically, a part where the cup-shaped member 90 and the cup-shaped member 92 as the two parts into which the shaft 50 is divided in the axial direction are fitted together) (a shaded region S1 surrounded by broken line in FIG. 9A), regions near those parts of the shaft 50 which are located radially inward of and face the axial ends of the first and second radially outer rotor cores 56, 58 (shaded regions S2 surrounded by broken line in FIG. 9A), and/or a region near a part of the shaft 50 which is located radially inward of and faces the first and second radially outer rotor cores 56, 58 and which is located on a line (centerline L between protruding poles shown in FIG. 9B) extending through the axis and the middle point between the rotor teeth 62, 66 adjoining each other in the circumferential direction of the first and second radially outer rotor cores 56, 58 (shaded regions S3 surrounded by broken line in FIGS. 9A and 9B).

If the DC exciting current to the exciting coil 70 is reduced to zero in the situation where a counter electromotive voltage needs to be reduced instantly during DC excitation of the exciting coil 70 (e.g., in the event of failure due to an abnormal condition of the three-phase system), an eddy current is generated in the shaft 50 in the magnetic path, and the DC exciting magnetic flux generated around the exciting coil 70 may not immediately disappear and remain (see FIG. 8), and therefore the counter electromotive voltage may not easily decrease.

The region in which the eddy current may flow in this case is especially the region near the part of the shaft 50 which is sandwiched in the axial direction between the first radially outer rotor core 56 and the second radially outer rotor core 58 of the radially outer rotor core 54 (specifically, the part where the cup-shaped member 90 and the cup-shaped member 92 as the two parts into which the shaft 50 is divided in the axial direction are fitted together) (the shaded region S1 surrounded by broken line in FIG. 9A).

Such an eddy current flows in the circumferential direction of the shaft in the region near the part of the shaft 50 which is sandwiched in the axial direction between the first radially outer rotor core 56 and the second radially outer rotor core 58 of the radially outer rotor core 54, flows in the circumferential direction of the shaft in the regions near those parts of the shaft 50 which are located radially inward of the first and second radially outer rotor cores 56, 58 and face the axial ends of the first and second radially outer rotor cores 56, 58, and flows in the axial direction of the shaft in the region near the part of the shaft 50 which is located radially inward of and faces the first and second radially outer rotor cores 56, 58 and which is located on the centerline L between protruding poles in the circumferential direction of the first and second radially outer rotor cores 56, 58.

Figure 10A:
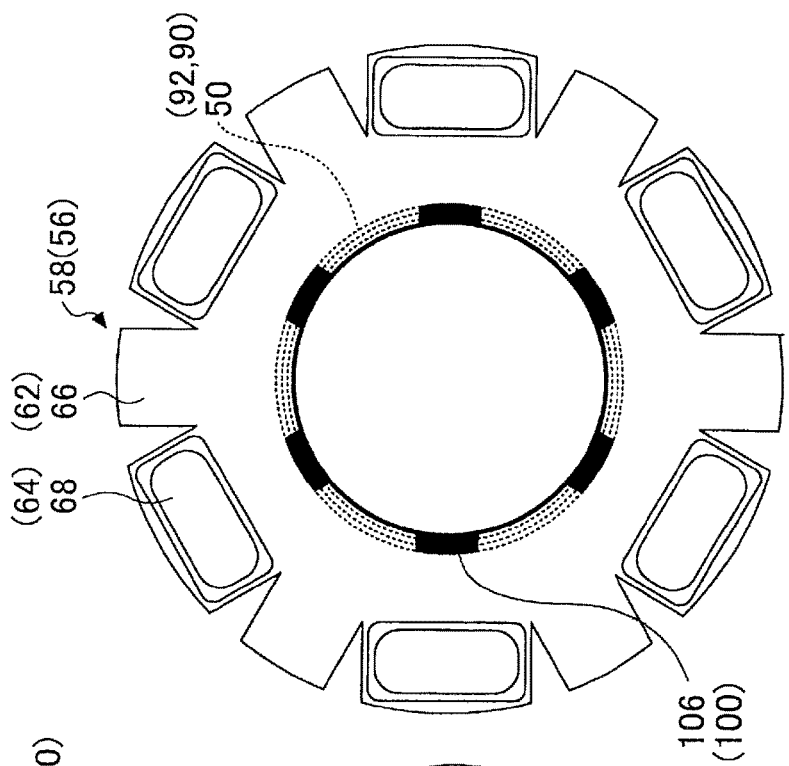
FIG. 10 shows diagrams showing the positions of means for suppressing an eddy current that is generated in the shaft in the hybrid excitation rotating electrical machine of the present embodiment.
Figure 10B:
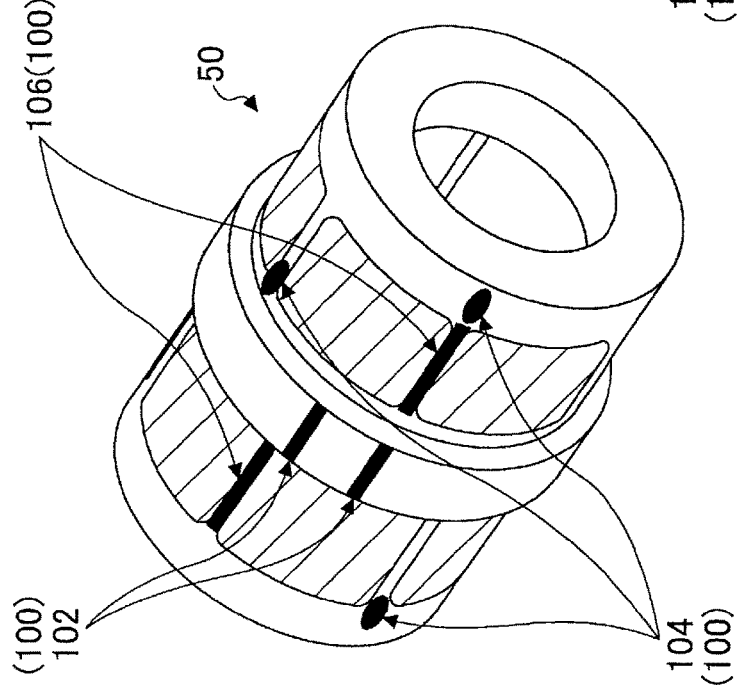

FIG. 10 shows diagrams showing the position of means for suppressing an eddy current that is generated in the shaft 50 in the hybrid excitation rotating electrical machine 10 of the present embodiment. FIG. 10A is a perspective view of the shaft 50, and FIG. 10B is a sectional view of the shaft 50 and its surrounding portion. FIG. 11 shows diagrams illustrating effects of the hybrid excitation rotating electrical machine 10 of the present embodiment. FIG. 11A shows a change with time in a current that is supplied to the exciting coil 70, FIG. 11B shows a change with time in a counter electromotive voltage in a comparative example that is compared with the present embodiment, and FIG. 11C is a change with time in a counter electromotive voltage in the present embodiment.

The hybrid excitation rotating electrical machine 10 of the present embodiment has eddy current suppressing means 100 for suppressing an eddy current that is generated in the shaft 50 as described above. That is, in the hybrid excitation rotating electrical machine 10, the shaft 50 is provided with the eddy current suppressing means 100 for suppressing an eddy current.

The eddy current suppressing means 100 is placed in the region of the shaft 50 in which an eddy current may flow, specifically, in the region near the part of the shaft 50 which is sandwiched in the axial direction between the first radially outer rotor core 56 and the second radially outer rotor core 58 of the radially outer rotor core 54 (specifically, the part where the cup-shaped member 90 and the cup-shaped member 92 are fitted together) (the shaded region S1), the regions near those parts of the shaft 50 which are located radially inward of the first and second radially outer rotor cores 56, 58 and face the axial ends of the first and second radially outer rotor cores 56, 58 (the shaded regions S2), and/or the region near the part of the shaft 50 which is located radially inward of and faces the first and second radially outer rotor cores 56, 58 and which is located on the centerline L between protruding poles extending through the axis and the middle point between the rotor teeth 62, 66 adjoining each other in the circumferential direction of the first and second radially outer rotor cores 56, 58 (the shaded regions S3).

For example, the eddy current suppressing means 100 is a slit 102 that is provided in the region near the part of the shaft 50 which is sandwiched in the axial direction between the first radially outer rotor core 56 and the second radially outer rotor core 58 of the radially outer rotor core 54. As shown in FIG. 10, this slit 102 opens in the direction toward the axis from the surface of the region near the part of the shaft 50 which is sandwiched in the axial direction between the first radially outer rotor core 56 and the second radially outer rotor core 58, and extends linearly in the axial direction. The slit 102 may be provided at one position in the circumferential direction of the shaft 50, but is preferably provided at a plurality of positions in the circumferential direction of the shaft 50.

With this slit 102, the electrical resistance at the time a current flows in the circumferential direction of the shaft in the region near the part of the shaft 50 which is sandwiched in the axial direction between the first radially outer rotor core 56 and the second radially outer rotor core 58 is larger than in the case where the slit 102 is not provided. Accordingly, an eddy current flowing in the circumferential direction of the shaft is suppressed in the region near this part.

For example, the eddy current suppressing means 100 is a hole 104 that is provided in the regions near those parts of the shaft 50 which are located radially inward of the first and second radially outer rotor cores 56, 58 and face the axial ends of the first and second radially outer rotor cores 56, 58. As shown in FIG. 10, the hole 104 is a void that extends in the direction toward the axis from the surfaces of the regions near those parts of the shaft 50 which are located radially inward of the first and second radially outer rotor cores 56, 58 and faces the axial ends of the first and second radially outer rotor cores 56, 58.

The hole 104 may extend linearly in the axial direction of the shaft 50. The hole 104 may be provided at one position in the circumferential direction of the shaft 50 for each of the axial ends of the first and second radially outer rotor cores 56, 58, but is preferably provided at a plurality of positions in the circumferential direction of the shaft 50. In order to suppress an eddy current, the hole 104 is preferably provided in the region near the part of the shaft 50 which is located on the centerline L between protruding poles in the circumferential direction of the first and second radially outer rotor cores 56, 58.

With the hole 104, the electrical resistance at the time a current flows in the circumferential direction of the shaft in the regions near those parts of the shaft 50 which are located radially inward of the first and second radially outer rotor cores 56, 58 and face the axial ends of the first and second radially outer rotor cores 56, 58 is larger than in the case where the hole 104 is not provided. Accordingly, an eddy current flowing in the circumferential direction of the shaft is suppressed in the regions near these parts.

Moreover, for example, the eddy current suppressing means 100 is a resin 106 that is provided in the region near the part of the shaft 50 which is located radially inward of and faces the first and second radially outer rotor cores 56, 58 and which is located on the centerline L between protruding poles extending through the axis and the middle point between the rotor teeth 62, 66 adjoining each other in the circumferential direction of the first and second radially outer rotor cores 56, 58. The resin 106 has higher electrical resistance than the body of the shaft 50. As shown in FIG. 10, the resin 106 is embedded in the region near this part of the shaft 50.

The resin 106 may extend linearly in the axial direction of the shaft 50. The resin 106 may be provided at one position in the circumferential direction of the shaft 50, but is preferably provided at a plurality of positions in the circumferential direction of the shaft 50. The resin 106 may be provided for each centerline L between protruding poles.

With the resin 106, the electrical resistance at the time a current flows in the axial direction of the shaft in the region near the part of the shaft 50 which is located radially inward of and faces the first and second radially outer rotor cores 56, 58 and which is located on the centerline L between protruding poles in the circumferential direction of the first and second radially outer rotor cores 56, 58 is larger than in the case where the resin 106 is not provided. Accordingly, an eddy current flowing in the axial direction of the shaft is suppressed in the region near this part.

As described above, according to the structure of the hybrid excitation rotating electrical machine 10 of the present embodiment, the slit 102, the hole 104, and/or the resin 106 as the eddy current suppressing means 100 is provided at the predetermined position on the shaft 50. This can suppress an eddy current that is generated in the shaft 50.

Accordingly, the present embodiment can reduce eddy current loss in the shaft 50 when the DC exciting magnetic flux fluctuates according to a change in DC exciting current including a harmonic component and supplied to the exciting coil 70, and can improve efficiency of the rotating electrical machine 10. Moreover, as compared to the configuration having no eddy current suppressing means 100, the present embodiment can reduce the DC exciting magnetic flux remaining around the exciting coil 70 when the DC exciting current to the exciting coil 70 is suddenly decreased to zero etc. (time t=t1 in FIG. 11), and thus can quickly reduce the counter electromotive voltage (see FIG. 11).

In the above embodiment, the permanent magnet excitation magnetic poles that are excited by the permanent magnets 64, 68 of the first and second radially outer rotor cores 56, 58 correspond to the "first magnetic poles" described in the claims, the permanent magnet non-excitation magnetic poles that are not excited by the permanent magnets 64, 68 correspond to the "second magnetic poles" described in the claims, the first and second radially outer rotor cores 56, 58 correspond to the "first and second cores" described in the claims, and the radially inner rotor core 80 corresponds to the "third core" described in the claims.

In the above embodiment, the rotor 12 and the shaft 50 are divided in the axial direction. However, the present invention is not limited to this, and each of the rotor 12 and the shaft 50 may be an integral member. In this modification, the notch holes 86, 88 extending in the axial direction need only be formed in both axial ends of the radially inner rotor core 80. The radially inner rotor core 80 need not be formed in a hollow shape in order to insert the bolt 98 that fastens the cup-shaped member 90 and the cup-shaped member 92 of the shaft 50 together, and the notch holes 86, 88 need not communicate with each other.

In the above embodiment, the radially inner rotor core 80 is fixed to the radially inner surface of the shaft 50 and rotates together with the rotor 12. However, the radially inner rotor core 80 may be, e.g., a non-rotating member placed in the shaft 50.

In the above embodiment, the slit 102 and the hole 104 which are formed at a predetermined position on the shaft 50 so as to extend from the surface of the shaft 50 toward the axis and the resin 106 that is embedded at a predetermined position on the shaft 50 are used as the eddy current suppressing means 100 for suppressing an eddy current that is generated in the shaft 50. However, any of the slit, hole, and resin may be used at any position as long as the eddy current is suppressed, and anything other than the slit, hole, and resin may be used as long as it has higher electrical resistance than the body of the shaft 50.

In order to suppress an eddy current that is generated in the shaft 50, it is desirable to place the eddy current suppressing means 100 in all of the shaded regions S1, S2, S3 shown in FIG. 9. However, the eddy current suppressing means 100 may be placed in any one or more of these regions.

This international application claims priority to Japanese Patent Application No. 2012-044851 filed on Feb. 29, 2012, and the disclosure of which is incorporated herein by reference in its entirety.

DESCRIPTION OF THE REFERENCE NUMERALS

10 Hybrid Excitation Rotating Electrical Machine
12 Rotor
14 Stator
24 Stator Core
28 Stator Coil
50 Shaft
52 Rotor Core
54 Radially outer Rotor Core
56 First Radially outer Rotor Core
58 Second Radially outer Rotor Core
60 Gap
62, 66 Rotor Tooth
64, 68 Permanent Magnet
70 Exciting Coil
72 Large Diameter Cylindrical Portion
80 Radially inner rotor core
84 Rotor Core Piece
86, 88 Notch Hole
90, 92 Cup-Shaped Member
100 Eddy Current Suppressing Means
102 Slit
104 Hole
106 Resin

The invention claimed is:

1. A hybrid excitation rotating electrical machine, comprising:
a rotor having a shaft extended on at least one side in an axial direction, and first and second cores that are separated in the axial direction with a gap between the cores, wherein first magnetic poles that are excited by a permanent magnet and second magnetic poles that are not excited by the permanent magnet are alternately arranged in a circumferential direction in each of the first and second cores, the first magnetic poles of the first core have a different polarity from that of the first magnetic poles of the second core, and the first magnetic poles of one of the first and second cores are placed so as to face the second magnetic poles of the other of the first and second cores in the axial direction with the gap between the magnetic poles;
a stator that is placed radially outward of the rotor, and that generates a rotating magnetic field rotating the rotor;
an exciting coil that is placed in the gap, and that excites the second magnetic poles; and
a third core that is placed radially inward of the first core, the second core, and the exciting coil, and that is made of a material having smaller iron loss than the shaft wherein:
the shaft is formed in a hollow shape,
each of the first core and the second core is placed radially outward of the shaft and is supported by the shaft, and
the third core is placed radially inward of the shaft and is supported by the shaft.

2. The hybrid excitation rotating electrical machine according to claim 1, further comprising:
eddy current suppressing means for suppressing an eddy current that is generated in the shaft due to fluctuation of magnetic flux in the exciting coil, wherein
the eddy current suppressing means is provided in the shaft.

3. The hybrid excitation rotating electrical machine according to claim 2, wherein
the eddy current suppressing means is provided in a region near a part of the shaft which is sandwiched in the axial direction between the first core and the second core, regions near those parts of the shaft which are located radially inward of and face axial ends of the first and second cores, and/or a region near a part of the shaft which is located radially inward of and faces the first and second cores and which is located on a line extending through a center between protruding poles in the circumferential direction of the first and second cores.

4. The hybrid excitation rotating electrical machine according to claim 2, wherein
the eddy current suppressing means is a slit or void that is formed in the shaft, or a member that is made of a material having higher electrical resistance than a body of the shaft.

5. The hybrid excitation rotating electrical machine according to claim 3, wherein
the eddy current suppressing means is a slit or void that is formed in the shaft, or a member that is made of a material having higher electrical resistance than a body of the shaft.

6. The hybrid excitation rotating electrical machine according to claim 5, wherein
each of the first core and the second core is formed by stacking a plurality of insulation coated electromagnetic steel plates in the axial direction, and
the third core is formed by compression molding insulation coated soft magnetic material powder.

7. The hybrid excitation rotating electrical machine according to claim 6, wherein
the third core is divided in the circumferential direction.

8. The hybrid excitation rotating electrical machine according to claim 7, wherein
the division of the third core in the circumferential direction is performed along lines extending through an axis and circumferential centers of at least two of all the first magnetic poles and the second magnetic poles that are alternately arranged in the circumferential direction.

9. The hybrid excitation rotating electrical machine according to claim 8, wherein
the third core is divided at regular intervals in the circumferential direction, and
the number of pieces into which the third core is divided in the circumferential direction is the number of the first magnetic poles and the second magnetic poles that are alternately arranged in the circumferential direction, or a divisor of the number of the first magnetic poles and the second magnetic poles.

10. The hybrid excitation rotating electrical machine according to claim 9, wherein
the third core has a notch hole in an axial end of the third core, and the notch hole has a diameter that decreases from an axial end face toward an axial center of the third core.

11. The hybrid excitation rotating electrical machine according to claim 1, wherein
each of the first core and the second core is formed by stacking a plurality of insulation coated electromagnetic steel plates in the axial direction, and
the third core is formed by compression molding insulation coated soft magnetic material powder.

12. The hybrid excitation rotating electrical machine according to claim 1, wherein
the third core is divided in the circumferential direction.

13. The hybrid excitation rotating electrical machine according to claim 12, wherein
the division of the third core in the circumferential direction is performed along lines extending through an axis and circumferential centers of at least two of all the first magnetic poles and the second magnetic poles that are alternately arranged in the circumferential direction.

14. The hybrid excitation rotating electrical machine according to claim 12, wherein
the third core is divided at regular intervals in the circumferential direction, and
the number of pieces into which the third core is divided in the circumferential direction is the number of the first magnetic poles and the second magnetic poles that are alternately arranged in the circumferential direction, or a divisor of the number of the first magnetic poles and the second magnetic poles.

15. The hybrid excitation rotating electrical machine according to claim 1, wherein
the third core has a notch hole in an axial end of the third core, and the notch hole has a diameter that decreases from an axial end face toward an axial center of the third core.

16. The hybrid excitation rotating electrical machine according to claim 15, wherein
the notch hole is formed in a tapered shape or a stair-like shape.

17. The hybrid excitation rotating electrical machine according to claim 15, wherein
the notch hole is formed at each of both axial ends;
the notch holes communicate with each other, and
the third core is formed in a hollow shape.

18. The hybrid excitation rotating electrical machine according to claim 1, wherein
the shaft is formed by fitting together two cup-shaped members into which the shaft is divided in the axial direction.

19. The hybrid excitation rotating electrical machine according to claim 18, wherein
one of the two cup-shaped members into which the shaft is divided in the axial direction supports the first core, the other cup-shaped member supports the second core, and the cup-shaped members are fitted together radially inward of the gap in which the exciting coil is placed.

* * * * *